(No Model.) 4 Sheets—Sheet 1.

A. W. PAULL.
OIL AND GAS STOVE.

No. 246,686. Patented Sept. 6, 1881.

Attest:
John Buckler,
F. W. Hanaford.

A. W. Paull,
Inventor,
By Worth Osgood,
Attorney.

(No Model.) 4 Sheets—Sheet 2.
A. W. PAULL.
OIL AND GAS STOVE.
No. 246,686. Patented Sept. 6, 1881.
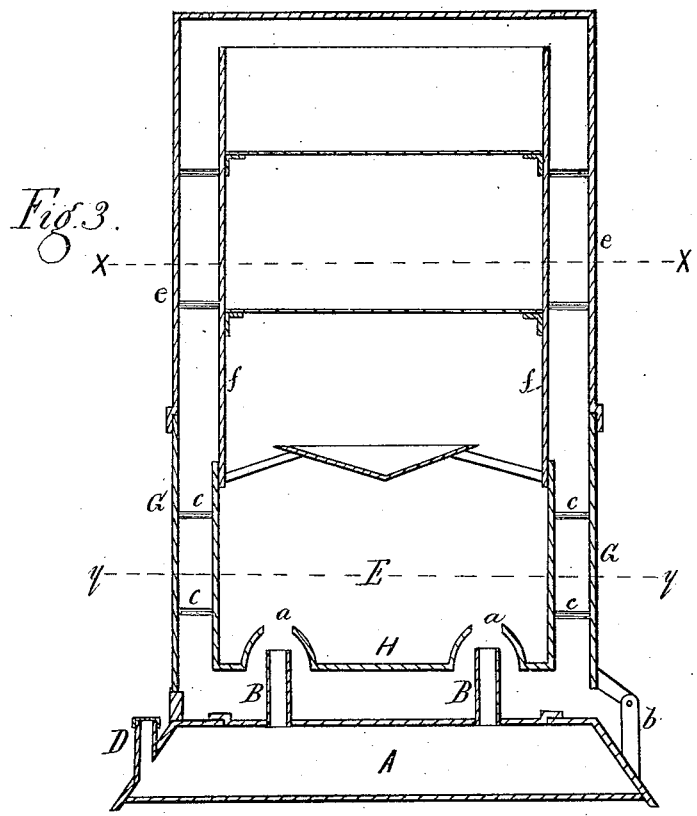
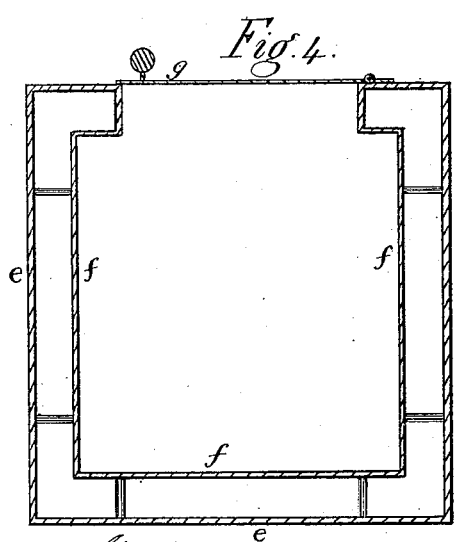
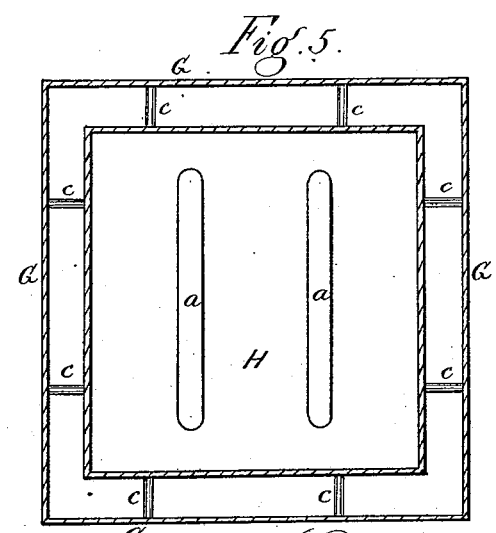

(No Model.)  4 Sheets—Sheet 3.

A. W. PAULL.
OIL AND GAS STOVE.

No. 246,686.  Patented Sept. 6, 1881.

Attest:
John Buckler,
F. W. Hanaford.

A. W. Paull,
Inventor.
By Worth Osgood,
Attorney.

(No Model.)  A. W. PAULL.  4 Sheets—Sheet 4.
OIL AND GAS STOVE.
No. 246,686. Patented Sept. 6, 1881.
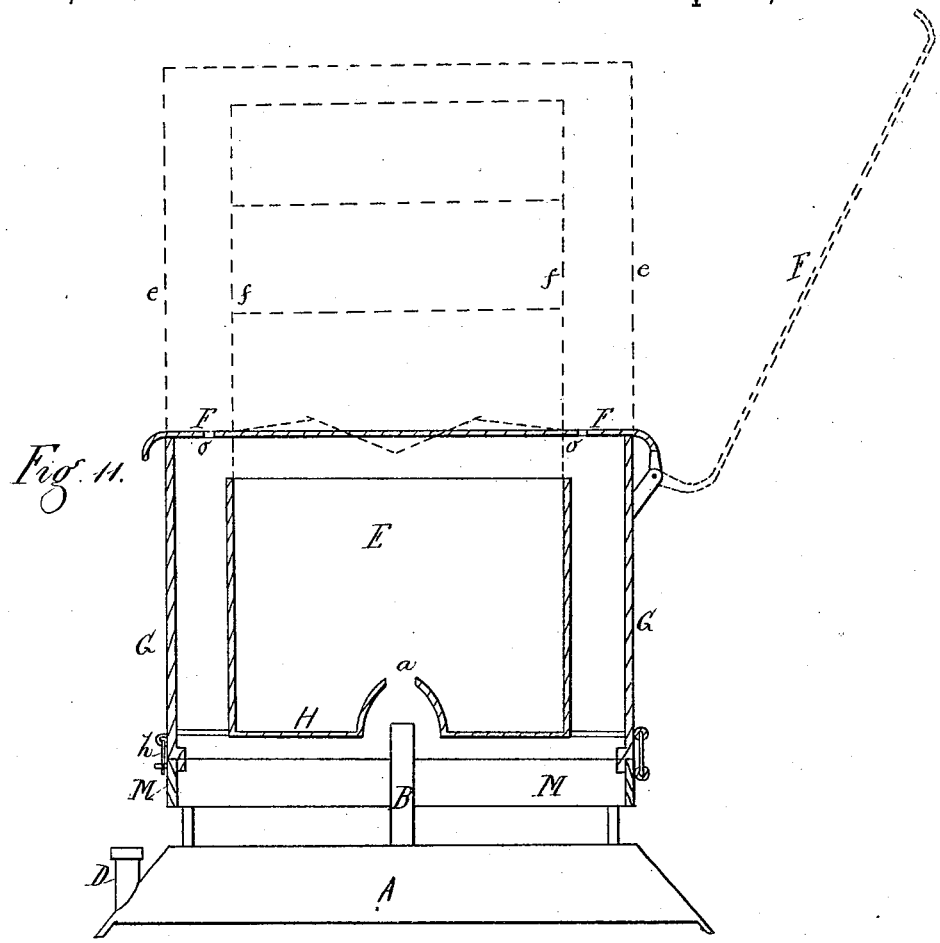
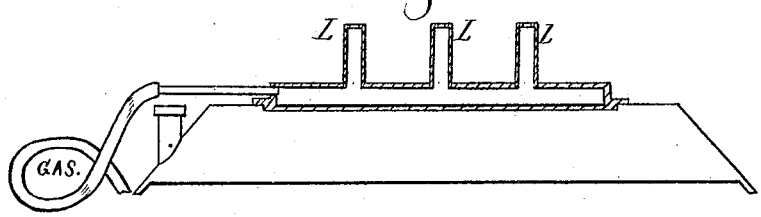
Attest:
John Buckler,
F. W. Hanaford.
A. W. Paull,
Inventor:
By Worth Osgood,
Attorney.

UNITED STATES PATENT OFFICE.

ARCHIBALD W. PAULL, OF WHEELING, WEST VIRGINIA.

OIL AND GAS STOVE.

SPECIFICATION forming part of Letters Patent No. 246,686, dated September 6, 1881.

Application filed June 27, 1881. (No model.)

*To all whom it may concern:*

Be it known that I, ARCHIBALD W. PAULL, of Wheeling, State of West Virginia, have invented certain new and useful Improvements in Oil and Gas Stoves, of which the following is a full, clear, and exact description, reference being had to the accompanying drawings, and to the letters of reference marked thereon.

My invention has relation to that class of stoves for heating and cooking which consume oil or gas for fuel, and which are ordinarily made small and portable; but the several features of the invention may obviously be applied upon stoves or heaters of a larger size, if desired.

The object of my invention is to produce a stove of the above-named class which may be burned in the wind or in drafts of air without interfering with the heating or working effect, and without causing smoke or the disagreeable odor so common to these portable stoves, and without interfering with the necessary steady combustion and the necessary uniform direction of the feed-air currents. To accomplish this the invention involves certain novel and useful features of construction, combinations or arrangements of parts, and principles of operation, all of which will be herein fully explained, and set forth in the claims.

Figure 1:
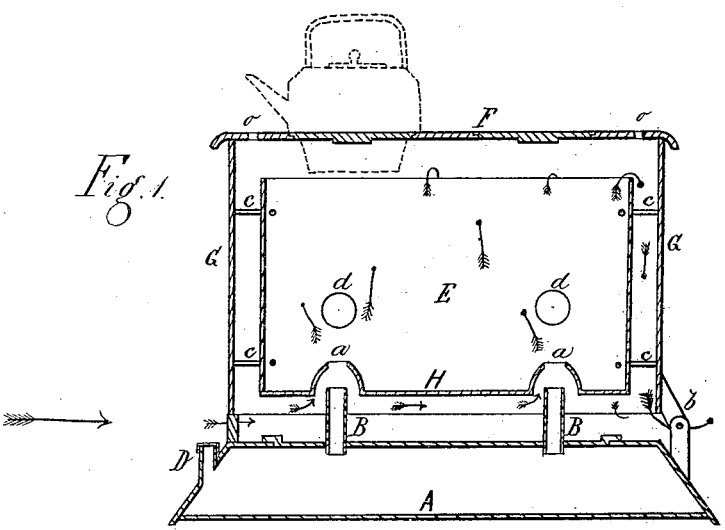
Figure 2:
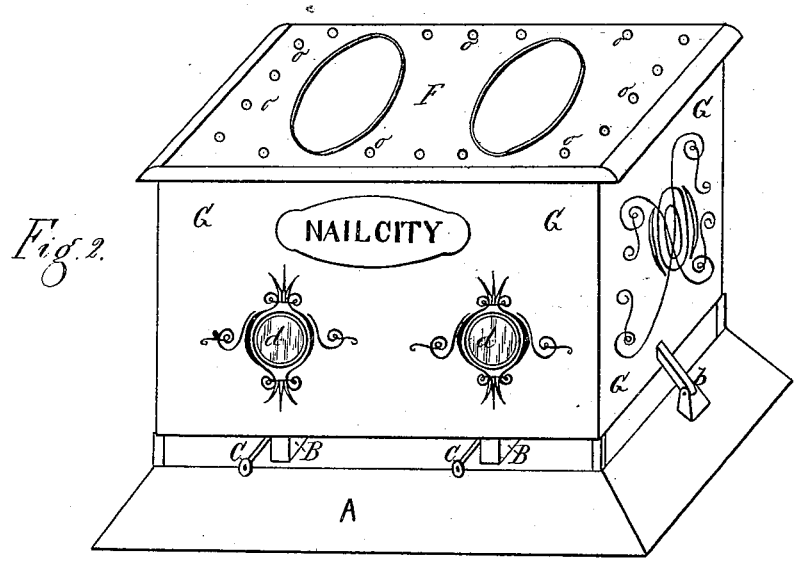
Figure 6:
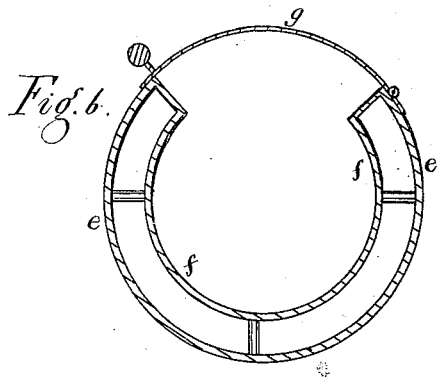
Figure 7:
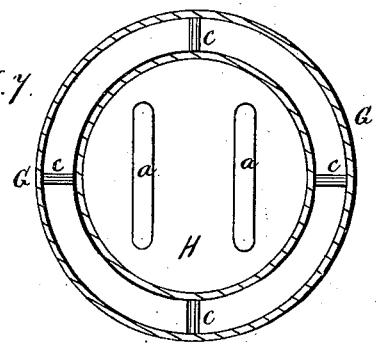
Figure 8:
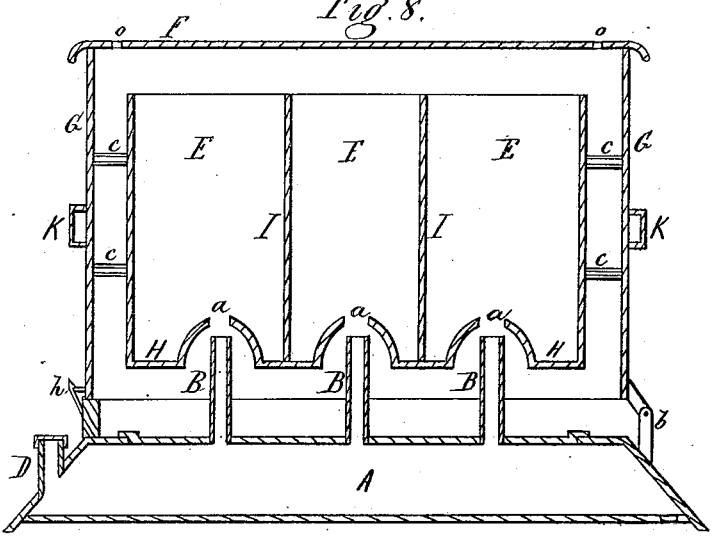
Figure 9:
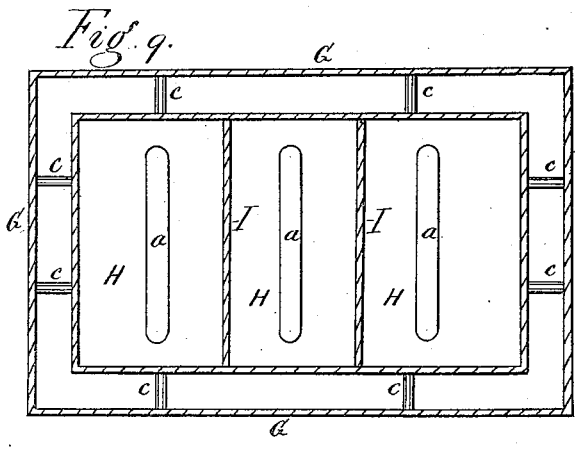
Figure 10:
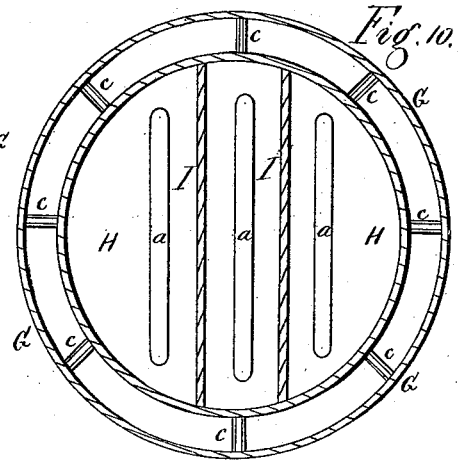

In the accompanying drawings, forming part of this specification, I have shown at Figure 1 a vertical section of a two-burner stove constructed in accordance with my invention, and at Fig. 2 a perspective view of the same. Fig. 3 is a vertical section of a stove and oven combined and arranged to operate together. Fig. 4 is a horizontal section through line $x\ x$ of Fig. 3, and Fig. 5 a similar section through line $y\ y$. Figs. 6 and 7 are horizontal sections through an oven and a stove respectively, both indicating that the devices are circular in form instead of being rectangular as in the other figures. Fig. 8 is a vertical section, showing the application of division-plates in the flame-chamber and handles on the exterior walls. Fig. 9 is a horizontal section of an oblong stove having the division-plates indicated in Fig. 8. Fig. 10 is a horizontal section of a circular stove having three burners and the vertical division-plates, as indicated in Fig. 8. Fig. 11 is a vertical section and partial elevation of a stove having a single burner, the body or upper part of the stove being mounted upon a band which is sustained at a suitable distance from the base by convenient forms of legs, the body of the stove being shown as hinged to the band, and the top or pot-hole plate hinged to the outer jacket, the dotted lines indicating the top plate thrown back and the oven placed in position to receive heat from the flame-chamber and to elongate the escape-passage for the products of combustion. Fig. 12 is a partial section and elevation, showing a stove-base detached from the body of the stove and supplied with an ordinary form of gas-burner instead of wick-tubes, as in some of the previous sections, and indicating that gas may be employed as well as oil for fuel.

In all these figures like letters of reference wherever they occur indicate corresponding parts.

A is an oil-pot, which may be of any of the usual forms, preferably serving as a base for the support of the upper part of the stove, and having one, two, or any other number of wick-tubes, B, with corresponding wick-elevators C.

D is the filling-orifice by which liquid fuel is supplied. Instead of having the main body of the liquid fuel beneath the flame-chamber, as indicated, it might be contained in a side reservoir, to be supplied to the wicks as desired and as is common in some other forms of stoves.

Above the wick-tubes B, I mount the main body of the stove, composed, essentially, of the flame-chamber, in which the combustion takes place, (represented at E,) a top or pot-hole plate or cover, F, a depending jacket, G, surrounding or partially surrounding the flame-chamber, leaving a free space between the two, and a cone-plate or deflecting-plate, H. The flame-chamber E communicates at top with the space between the walls of this chamber and the jacket G, and this flue or space is open to the air at bottom, the lower end of jacket G being located above and free from the oil-pot or base of the stove.

The stove so organized takes its air for support of combustion from the exterior of the structure directly over the top of the base, and this feed-air passes up through the cone-slots $a$ to the flame-chamber. The products of combustion, after expending their heat against the pot-hole plate or against the vessels located therein, are compelled to pass between the upper margin of the walls of the flame-chamber and the top plate; thence downwardly through the channel inclosed by the jacket G, and out from the structure through the same general opening through which the feed-air is admitted. When the stove is standing in a perfectly quiet atmosphere the escaping products of combustion find an exit close to the lower end of the jacket, and the incoming fresh-air currents, being cooler and heavier, find their way in over the top of the base; but a perfectly quiet atmosphere about a stove in operation is practically impossible. At least slight disturbances of the surrounding atmosphere will occur, and it is these disturbances which cause the smoking of the common forms of oil and gas stoves when burned in a closed room. Under ordinary circumstances my improved stove will take the feed-air on the sides toward which the currents are moving and discharge the products of combustion on the opposite sides.

It is especially desirable that the stove be capable of withstanding the effects of drafts of wind or air or be capable of burning out of doors, and when exposed to currents however strong, the operation of my improved stove is the same as in the lighter currents above referred to, except, of course, that as the current is increased the supply of feed-air, and consequently the intensity of combustion and resulting heating capacity, is increased. Any current entering at the bottom opening will either increase the upward flow through the cone-plate (by direct action thereon) or cause an exhaustion from the channel which conducts the products of combustion, either action operating to maintain a constant upward flow through the flame-chamber and to prevent any downward flow therethrough by which the flame would be caused to smoke or be extinguished. For burning in very high winds or drafts it may be necessary to prevent the too violent admission of the feed-air by the application of perforated plates or deflectors about the burners, as is well understood, and as is contemplated, though not illustrated, herein. The products of combustion being compelled to traverse the length of the outer channel before finding an exit, it is plain that they cannot escape before expending the greater part of their heat, and their escape-opening being in such close proximity to the inlet for feed-air, any currents which affect them must also affect the feed-air, and thus produce the most complete combustion.

It will be observed that all these desirable and practically essential requisites—viz., the constant upward current through the flame-chamber, the feeding of fresh air in amount corresponding to the withdrawal of products of combustion, the prevention of reversal of currents in the stove, and its adaptability to withstand the effects of passing air-currents—are all accomplished without the use of any form of ejecting-surface to act upon the currents at the discharge-opening or any injecting device applied at the inlet for fresh air, and therefore that the structure is more simple, and consequently less expensive, than those devices which require the injectors and ejectors. And further, it will be observed that the retardation of the products of combustion, caused by compelling them to take the downward course alongside of the flame-chamber, must result in a superior heat-giving capacity of the stove.

The stove organized and operating as above explained may be made round, square, oblong, oval, or any other desired shape. The parts may be made of cast or sheet metal, as desired. For the outer jacket a very light material may be employed—such, for instance, as ordinary tin.

For trimming, cleaning, lighting, &c., the upper part of the structure is hinged to the base as by an ordinary form of hinge, (shown at $b$,) though this hinge might be omitted and the whole upper part made removable.

The jacket is connected with the walls of the flame-chamber in any suitable manner, so that both will remain in their proper relative positions. At $c\ c$ are shown suitable stays passing directly from one part to the other.

The usual peep-holes, $d\ d$, are supplied for the purpose of inspecting the state of the flame without disturbing the stove, and these are simply covered with plates of mica in the usual manner.

Instead of hinging the stove-body to the base to facilitate lighting, &c., or instead of making it removable, as above explained, a door might be provided in one side, the same being double, of course, so as to afford a passage through the channel between the jacket and walls of the flame-chamber within. It is not necessary that the jacket should extend entirely around the flame-chamber, though much preferred, because then the stove will operate in any draft, no matter from what point it strikes the structure.

The top or pot-hole plate may, in some forms, be connected directly with the outer jacket; but it is preferably made removable therefrom in all cases, so that the oven or other utensil may be applied, as explained below.

To enlarge the stove for baking purposes, or, in other words, to apply the oven thereon, I remove the top or pot-hole plate and place the oven directly over the open upper end of the structure. The oven is composed, like the stove-body, of two walls, separated from each other by a little distance. The outer oven-walls, $e$, are made to fit closely over the jacket G, and the inner walls, $f$, to register with the walls of the flame-chamber. Beneath the top of the oven is an escape-passage, same as in the stove when the top plate is in place, and when the oven is properly located the products of combustion ascend to the top, pass through the escape-passage down between walls $e$ and $f$, down between the walls of the flame-chamber and its jacket G, and out at the same place as before explained. Thus the stove, with the oven upon it, will operate upon same principles as when the oven is not in use. When the oven is in place the escape flue or channel for the products of combustion is, of course, greatly elongated. The back pressure against their escape is therefore greater, and consequently a much greater proportion of their heat will be given up to the articles being baked than would be given in the ordinary forms of ovens.

The oven-door $g$ is shown as of a single thickness, but it may be made double, if desired, so as not to interfere with the continuous escape-passage for products of combustion.

When two or more burners are employed it may be advantageous to separate the flame-chamber into different compartments, so that one flame may be employed and not the others, to avoid the necessity of heating the whole chamber; and this I accomplish by use of the removable division-plates I I in the usual form. These should extend only to the top of the walls of the flame-chamber.

For handling or moving the stove, any convenient form of handles, as at K, may be employed, and the side opposite the hinge may be secured to the base by any convenient form of catch, as at $h$. If no hinge be employed, two or more catches like $h$ will serve to connect the upper part of the stove and the base with each other. To prevent overheating of the oil-pot I propose to employ the usual appliances—such as the water-pan or a top coating of plaster-of-paris or other non-conducting material—if any such be found necessary. Under ordinary circumstances the constant current of fresh air passing over the top of the oil-chamber will be found to be sufficient to prevent overheating.

The pot-hole plate or top plate, instead of being made solid, is provided with a number of small perforations, as at $o$ $o$, to admit of the passage of a small portion of the heated air, &c., from the flame-chamber, so that the burners shall always have a sufficient draft, but not large enough to interfere materially with the passage of the greater part down through the channel provided especially for the purpose.

The top plate of the oil-pot is shown as being detachable from the remaining part, so that the wick-tubes may be removed and the gas-burners L substituted for them. This makes the one structure capable of use with oil or gas. Of course the stove may be fitted for use with either, and any form of liquid or gaseous fuel may be employed, the improvements being equally advantageous with any of the ordinary forms of burners which it is proposed to employ.

Instead of the double-walled oven made to register with the lower parts of the stove, as explained, any other correspondingly-constructed cooking utensil (with the double walls) may be placed upon the stove and like advantages be obtained.

It will be seen that the products of combustion are discharged at a point in the region of the location of the flames, so as to obtain the best effects on the flames by the exhaustion of products of combustion or the incoming of feed-air, or both together.

The cone-plate may be connected with the walls of the flame-chamber and with the outer jacket, and these parts made removable from a band, M, elevated above the base of the stove and serving to elongate the mouth of the escape-channel, as shown at Fig. 11, and this whether a hinge be employed or not. In the same figure the top plate is shown as hinged to the outer jacket, so that it may be turned back out of the way of the oven. The cone-plate in this construction obviates the necessity of other means for connecting the outer jacket, G, with the walls of the flame-chamber. Generally the means of connecting the parts is no essential part of my invention, since various hinges, catches, &c., may be used, as is well known in the stoves of portable character.

I have shown such forms as I regard as best adapted for carrying out my improvements, and leave minor details to the judgment of the parties making the stoves.

The improved stove is applicable for heating purposes as well as for cooking.

The holes $o$ $o$ might be located in the walls of the outer jacket, G, instead of in the top plate, and the oven may be provided with similar openings.

Having now fully described my invention, what I claim as new herein, and desire to secure by Letters Patent, is—

1. The herein-described stove, composed of the base, the burners, a cone-plate elevated above the base, a flame-chamber, a top or pot-hole plate, a jacket surrounding the flame-chamber and forming therewith a flue for the escape of the products of combustion, the inlet for fresh air being beneath the lower end of the jacket, and outlet for products of combustion being through the same opening surrounding the burners, the whole constructed and arranged to operate substantially as herein shown and set forth.

2. The combination, with the flame-chamber, of the surrounding jacket, the top or pot-hole plate covering the two, the cone-plate elevated above the base of the stove, and the inlet for fresh air and outlet for products of combustion located in one and the same opening beneath the cone-plate and surrounding the burners, substantially as shown and set forth.

3. In a stove having the flue for the escape of the products of combustion located around the flame-chamber, and discharging its contents in the region of the burners, the combination, with the flame-chamber and flue, of a top or pot-hole plate provided with small perforations, substantially as and for the purposes set forth.

4. The combination of the flame-chamber, a surrounding jacket communicating therewith at top, and a pot-hole plate or top covering the two, the inlet for fresh air and the outlet for products of combustion being located in one and the same opening beneath the cone-plate and surrounding the burners, and the whole connected with the base of the stove in the manner explained, so that the burners may be uncovered for lighting, &c., substantially as shown and described.

5. In combination with a gas or oil stove having the escape for the products of combustion surrounding the flame-chamber and discharging through the same opening which constitutes the fresh-air inlet-passage, an oven or equivalent cooking vessel or utensil mounted over the stove and made removable therefrom, said oven or vessel being provided with double walls, the space between which is made to register with the before-named escape for the products of combustion, substantially as and for the purposes set forth.

In testimony that I claim the foregoing I have hereunto set my hand in the presence of two witnesses.

A. W. PAULL.

Witnesses:
WORTH OSGOOD,
JOHN BUCKLER.